United States Patent
Yamaguchi et al.

(10) Patent No.: US 6,451,952 B2
(45) Date of Patent: Sep. 17, 2002

(54) PRODUCTION PROCESS FOR ALLYL ETHER-BASED POLYMER

(75) Inventors: Shigeru Yamaguchi, Yao; Takashi Fujisawa, Suita, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/849,228

(22) Filed: May 7, 2001

(30) Foreign Application Priority Data

May 26, 2000 (JP) ........................................ 2000-156027

(51) Int. Cl.$^7$ ........................... C08F 116/12; G01V 8/00
(52) U.S. Cl. ..................... 526/333; 526/266; 526/268; 526/270; 526/277; 526/287; 526/328.5; 526/332
(58) Field of Search ................................ 526/266, 268, 526/270, 279, 287, 328.5, 332, 333

(56) References Cited

U.S. PATENT DOCUMENTS

| | | | |
|---|---|---|---|
| 4,500,693 A | 2/1985 | Takehara et al. | 526/240 |
| 4,659,481 A | 4/1987 | Chen | 210/697 |

FOREIGN PATENT DOCUMENTS

| | | |
|---|---|---|
| EP | 0990465 A2 * | 4/2000 |
| JP | 58147412 | 9/1983 |
| JP | 59-22698 A * | 2/1984 |
| JP | 6259640 | 12/1987 |

* cited by examiner

*Primary Examiner*—Helen L. Pezzuto
(74) *Attorney, Agent, or Firm*—Roylance, Abrams, Berdo & Goodman, L.L.P.

(57) ABSTRACT

The present invention, for example, provides a production process for a water-soluble polymer which is suitable for a component of a scale inhibitor which controls the formation of scale even in joint use with anticorrosives such as zinc-based or condensed phosphoric acid-based ones, and has so excellent gelation resistance as to be difficult to precipitate, and contains no or little phosphorus. This production process is a production process for an allyl ether-based polymer and comprises the step of polymerizing at least one monomer component that includes an allyl ether-based monomer as an essential component, wherein: the allyl ether-based monomer is an allyl ether-based monomer of the below-mentioned general formula (1); and the content of a compound of the below-mentioned general formula (2) in the monomer component is not more than 500 ppm of the monomer component;

wherein the general formula (1) is:

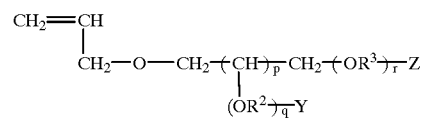

and wherein the general formula (2) is:

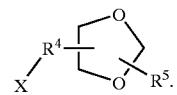

9 Claims, No Drawings

PRODUCTION PROCESS FOR ALLYL ETHER-BASED POLYMER

BACKGROUND OF THE INVENTION

A. Technical Field

The present invention relates to a production process for an allyl ether-based polymer. Specifically, the invention relates to a production process for an allyl ether-based polymer which is favorably used for an additive to water systems, wherein specific examples of the additive to water systems include: treating agents for water systems; detergents; water-treating agents; fiber-treating agents; scale inhibitors; and detergent builders.

B. Background Art

The scale inhibitors are used as water-treating agents for such as boilers, condensers, heat exchangers, and gas-washing towers.

Cations, such as calcium ion and magnesium ion, or anions, such as carbonate ion, bicarbonate ion, sulfite ion, and sulfate ion, and further, as the case may be, zinc ion or phosphate ion derived from anticorrosives, tend to deposit themselves in the form of scale on the following: heat transfer faces of such as boilers, condensers, and heat exchangers; surfaces of materials packed in gas-washing towers; or inner surfaces of piping. Particularly, this phenomenon badly occurs particularly in systems which involve the use of refrigerants having a high Ca concentration and a high pH and being called brine.

Such adhesion of scale brings about not only an increase in operation costs due to heat transfer effect deterioration or due to an increase in the through-flow resistance, but also abnormality of indicated values and a delay of the response speed due to the adhesion of scale to sensors of various meters such as thermometers and pH meters. In addition, such as local corrosion makes it difficult to continue normal operation. The adhered scale is so hard as not to be easy to peel off. Therefore, a great deal of costs are also needed for such as stop of operation or removal of the scale.

Thus, such as lignin-based compounds, phosphorus-based compounds, and poly((meth)acrylate salts) are conventionally used as scale inhibitors in order to inhibit the above adhesion of scale.

However, the lignin-based compounds have problems of uneven quality. In addition, as to the phosphorus-based compounds, including those which are added as the aforementioned anticorrosives, the hydrolyzed phosphate ion acts as a scale component when being high concentrated. Furthermore, if such a scale component comprising the phosphate ion is further contained in blow water and, together therewith, discharged from the system into closed water systems such as lakes, marshes, and inland seas, then the scale component causes serious environmental pollution such as red water. Of the above conventional scale inhibitors, the poly((meth)acrylate salts) are valued highly, but still easily produce scale such as zinc-based or phosphorus-based scale when being high concentrated.

Thus, in order to solve the above-mentioned problems, the present inventors proposed a scale inhibitor comprising a copolymer derived from monomer components including a (meth)acrylic acid-based monomer and an allyl ether-based monomer as an excellent scale inhibitor containing no or little phosphorus (JP-B-059640/1987).

However, a series of the present inventors' further studies to provide a scale inhibitor which displays still higher performance have revealed that even the above polymeric scale inhibitor easily insolubilizes in boiler water systems or cooling water systems and is therefore inferior in performance as a scale inhibitor if the above polymeric scale inhibitor has low gelation resistance.

SUMMARY OF THE INVENTION

A. Object of the Invention

The present invention has been done in order to solve the above-mentioned problems, and its main object is to provide: a scale inhibitor which controls the formation of scale even in joint use with anticorrosives such as zinc-based or condensed phosphoric acid-based ones, and has so excellent gelation resistance as to be difficult to precipitate, and contains no or little phosphorus; and a polymer favorable as a raw material for this scale inhibitor; and further, similarly, a copolymer which is also applicable to an additive to water systems in fields where properties corresponding to the gelation resistance are desired.

B. Disclosure of the Invention

The present inventors diligently studied to achieve the above-mentioned object. As a result, they have found out that it is important for solution of the problems that a specific allyl ether-based monomer of the below-mentioned general formula (1) is used as the allyl ether-based monomer which is essential to the monomer component for polymerization, and that the content of a compound of the below-mentioned general formula (2) as an impurity in the monomer component in the polymerization step is not more than a specific value.

More specifically, the inventors have further found out that if a polymer has a specific structural unit derived from the aforementioned specific allyl ether-based monomer and if in this polymer the content of a dioxolane compound having an alkyl group and a haloalkyl group as substituents is not more than a specific value, then this polymer has properties suitable for various additives to water systems (e.g. treating agents, detergents, water-treating agents, fiber-treating agents, detergent builders).

In the process of the above study, the present inventors presumed various impurities in monomer components, as used for polymerization, to have an influence upon properties of a polymer obtained by polymerizing the monomer components. Furthermore, the inventors directed their attention to raw materials for producing the allyl ether-based monomer of the general formula (1) indispensable for the monomer components and, as a result, have known that the amount of a specific compound existing in the above raw materials has an influence upon properties of the polymer, and further that this compound is specifically a substituted dioxolane compound of the below-mentioned general formula (2).

A production process for an allyl ether-based polymer, according to the present invention, comprises the step of polymerizing at least one monomer component that includes an allyl ether-based monomer as an essential component, wherein: the allyl ether-based monomer is an allyl ether-based monomer of the below-mentioned general formula (1); and the content of a compound of the below-mentioned general formula (2) in the monomer component is not more than 500 ppm of the monomer component;

wherein the general formula (1) is:

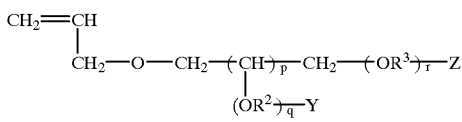

wherein:
p denotes an integer of 1 to 4;
q and r independently of each other denote 0 or an integer of 1 to 100;
$R^2$ and $R^3$ independently of each other denote an alkylene group with 2 to 4 carbon atoms; and
Y and Z independently of each other denote a hydroxyl group, an alkoxyl group with 1 to 4 carbon atoms, a monovalent phosphoric acid group (which may be in the form of a monovalent or divalent metal salt, an ammonium or organic amine salt, or a monoester or diester of an alkyl group with 1 to 4 carbon atoms), or a monovalent sulfonic acid group (which may be in the form of a monovalent or divalent metal salt, an ammonium or organic amine salt, or an ester of an alkyl group with 1 to 4 carbon atoms), or Y and Z are linked together and denote a divalent phosphoric or sulfonic acid group as a whole;
and wherein the general formula (2) is:

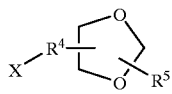

wherein:
$R^4$ denotes an alkylene group with 2 to 4 carbon atoms;
$R^5$ denotes an alkyl group with 1 to 5 carbon atoms; and
X denotes a halogen.

More specifically, the compound of the above general formula (2), for example, might be an impurity in the raw materials as used when producing the above allyl ether-based monomer (I). In addition, this compound might be an impurity formed by a side reaction when producing the above allyl ether-based monomer (I).

In the production process for an allyl ether-based polymer, according to the present invention, if the content of the compound of the above general formula (2) is limited to not more than 500 ppm, then a polymer obtained from the polymerization by the process according to the present invention is enabled to have so excellent gelation resistance, for example, as never to insolubilize in boiler water systems or cooling water systems.

In addition, the above polymer is enabled to be a polymer useful for scale inhibition, which polymer can inhibit the deposition of the zinc ion or phosphate ion and thereby control the formation of scale even in joint use with anticorrosives such as zinc-based or condensed phosphoric acid-based ones, and contains no or little phosphorus because of containing no phosphorus compound and is therefore excellent in property of low environmental pollution.

In addition, similarly, the polymer obtained from the polymerization by the process according to the present invention is optimum also as a polymer having not only various properties corresponding to properties such as gelation resistance, but also other various properties (e.g. detergency, dispersibility for such as pigments and clay) desirable as an additive to water systems. Therefore, the allyl ether-based polymer according to the present invention is optimum as various additives to water systems.

The polymer, which is obtained from the polymerization by the process according to the present invention, is excellent in various properties, and is a water-soluble polymer usable for various additives to water systems.

In the production process for an allyl ether-based polymer, according to the present invention, it is favorable that the monomer components which are copolymerized include the allyl ether-based monomer of the aforementioned general formula (1) in a ratio of 1.0–95.0 weight % wherein the total of the monomer components used is 100 weight %, and more specifically that the monomer components which are copolymerized include the allyl ether-based monomer (I) of the aforementioned general formula (1) in a ratio of 1.0–95.0 weight %, a (meth)acrylic acid-based monomer (II) in a ratio of 99.0–5.0 weight %, and another copolymerizable monomer (III) in a ratio of 0–70 weight % wherein the total of these monomer components is 100 weight %.

A polymer obtained in a favorable mode for carrying out the process according to the present invention is a polymer which has an allyl ether-based monomer-derived structural unit of the below-mentioned general formula (3) in a ratio of 0.5–80 mol % to the polymer and a (meth)acrylic acid-based monomer-derived structural unit of the below-mentioned general formula (4) in a ratio of 20–99.5 mol % to the polymer,
wherein the general formula (3) is:

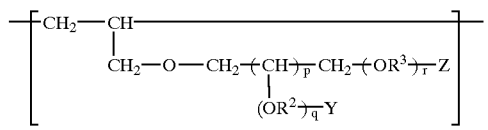

wherein:
p denotes an integer of 1 to 4;
q and r independently of each other denote 0 or an integer of 1 to 100;
$R^2$ and $R^3$ independently of each other denote an alkylene group with 2 to 4 carbon atoms; and
Y and Z independently of each other denote a hydroxyl group, an alkoxyl group with 1 to 4 carbon atoms, a monovalent phosphoric acid group (which may be in the form of a monovalent or divalent metal salt, an ammonium or organic amine salt, or a monoester or diester of an alkyl group with 1 to 4 carbon atoms), or a monovalent sulfonic acid group (which may be in the form of a monovalent or divalent metal salt, an ammonium or organic amine salt, or an ester of an alkyl group with 1 to 4 carbon atoms), or Y and Z are linked together and denote a divalent phosphoric or sulfonic acid group as a whole;
and wherein the general formula (4) is:

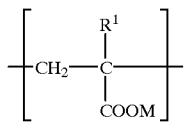

wherein:
$R^1$ denotes an alkyl group with 1 to 12 carbon atoms or an alicyclic alkyl group; and M denotes a metal salt;

and wherein the content of a compound of the below-mentioned general formula (2) in the polymer is not more than 500 ppm of the polymer, wherein the general formula (2) is:

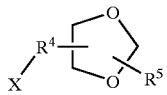

wherein:

$R^4$ denotes an alkylene group with 2 to 4 carbon atoms;

$R^5$ denotes an alkyl group with 1 to 5 carbon atoms; and

X denotes a halogen.

The adoption of these constitutions, more specifically, the use of this water-soluble polymer as a scale inhibitor that is one of uses of additives to water systems, enables this polymer to have so still higher gelation resistance as to inhibit the insolubilization of this polymer to a minimum in boiler water systems or cooling water systems, and accordingly can realize scale inhibition of still higher performance.

The above polymer is enabled to be a polymer useful for scale inhibition, which polymer can inhibit the deposition of the zinc ion or phosphate ion and thereby control the formation of scale even in joint use with anticorrosives such as zinc-based or condensed phosphoric acid-based ones, and contains no or little phosphorus because of containing no phosphorus compound and is therefore excellent in property of low environmental pollution. Furthermore, this polymer is enabled to be a polymer which has so excellent gelation resistance as never to insolubilize in boiler water systems or cooling water systems.

Obtainable from the above constitutions is a scale inhibitor which can inhibit the deposition of the zinc ion or phosphate ion and thereby control the formation of scale even in joint use with anticorrosives such as zinc-based or condensed phosphoric acid-based ones, and contains no or little phosphorus because of containing no phosphorus compound and is therefore excellent in property of low environmental pollution. Furthermore, this scale inhibitor is a high performance scale inhibitor which has so excellent gelation resistance as never to insolubilize in boiler water systems or cooling water systems.

These and other objects and the advantages of the present invention will be more fully apparent from the following detailed disclosure.

DETAILED DESCRIPTION OF THE INVENTION

Hereinafter, subject-matter of the present invention is explained in detail.

Examples of the allyl ether-based monomer (I) of the above general formula (1) used in the present invention include: 3-allyloxypropane-1,2-diol, 3-allyloxypropane-1,2-diol phosphate, 3-allyloxypropane-1,2-diol sulfonate, 3-allyloxy-1,2-di(poly)oxyethylene ether propane, 3-allyloxy-1,2-di(poly)oxyethylene ether propane, 3-allyloxy-1,2-di(poly)oxyethylene ether propane phosphate, 3-allyloxy-1,2-di(poly)oxyethylene ether propane sulfonate, 3-allyloxy-1,2-di(poly)oxypropylene ether propane, 3-allyloxy-1,2-di(poly)oxypropylene ether propane phosphate, 3-allyloxy-1,2-di(poly)oxypropylene ether propane sulfonate, 6-allyloxyhexane-1,2,3,4,5-pentanol, 6-allyloxyhexane-1,2,3,4,5-pentanol phosphate, 6-allyloxyhexane-1,2,3,4,5-pentanol sulfonate, 6-allyloxy-1,2,3,4,5-penta(poly)oxyethylene ether hexane, 6-allyloxy-1,2,3,4,5-penta(poly)oxypropylene ether hexane, 3-allyloxy-2-hydroxypropanesulfonic acid, and monovalent metal salts, divalent metal salts, ammonium salts, or organic amine salts of these exemplifying compounds, or phosphate esters or sulfate esters of the above exemplifying compounds, and monovalent metal salts, divalent metal salts, ammonium salts, and organic amine salts of the phosphate esters or sulfate esters; 3-allyloxy-2-(poly)oxyethylenepropanesulfonic acid and its monovalent metal salts, divalent metal salts, ammonium salts, or organic amine salts, or phosphate esters or sulfate esters of these compounds, and monovalent metal salts, divalent metal salts, ammonium salts, or organic amine salts of the phosphate esters or sulfate esters; and 3-allyloxy-2-(poly)oxypropylenepropanesulfonic acid and its monovalent metal salts, divalent metal salts, ammonium salts, or organic amine salts, or phosphate esters or sulfate esters of these compounds, and monovalent metal salts, divalent metal salts, ammonium salts, or organic amine salts of the phosphate esters or sulfate esters. Of these allyl ether-based monomers, compounds of p=1 in the aforementioned general formula (1) have the advantage of being easy to industrially obtain.

The monomer component used in the present invention comprises at least one of the above allyl ether-based monomers (I), and the content of the compound of the below-mentioned general formula (2) in the monomer component is not more than 500 ppm of the monomer component.

Herein the general formula (2) is as follows:

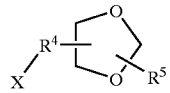

wherein:

$R^4$ denotes an alkylene group with 2 to 4 carbon atoms;

$R^5$ denotes an alkyl group with 1 to 5 carbon atoms; and

X denotes a halogen.

The above compound is specifically a dioxolane compound having an alkyl group and a haloalkyl group.

The displacement positions of these substituents are not especially limited, and the elemental sort of the above halogen is not limited, either. In addition, $R^4$ denotes an alkylene group with 2 to 4 carbon atoms; $R^5$ denotes an alkyl group with 1 to 5 carbon atoms; and X denotes a halogen element. In addition, if X is a halogen element, it is not especially limited, but specifically it is a halogen element selected from among fluorine, chlorine, bromine, and iodine, and more specifically, chlorine.

A particular representative of the above compounds is a dioxolane compound in which: the alkyl group represented by $R^5$ is an ethyl group, and the haloalkyl group represented by <X-$R^4$-> is a chloromethyl group; and more specifically, a 2-alkyl-4-haloalkyldioxolane, and still more specifically, 2-ethyl-4-chloromethyldioxolane.

The compound of the above general formula (2) is derived from raw materials such as allyl glycidyl ether which is a glycidyl compound that is an epoxy compound used for producing the allyl ether-based monomer used in the present invention, and is derived from epoxy compounds and alkylaldehydes having a halogen element as a substituent. Specifically, this compound is by-produced from epichlorohydrin, which is an epihalohydrin that is a raw material for producing allyl glycidyl ether, and from propylaldehyde which is contained in a raw material. Thereby formed is the dioxolane compound of the above general formula (2) having an haloalkyl group and an alkyl group as substituents. The attachment positions of the substituents in the dioxolane structure are not especially limited. As to the above dioxolane compound, there might form those in which the substitution positions are different according to such as reaction conditions or production conditions. More specifically about the reaction mechanism, the dioxolane compound is a 2-alkyl-4-haloalkyldioxolane having substituents at the 2-position and the 4-position.

In the present invention, the present inventors directed their attention to the amount of this impurity being formed. Then, the specific allyl ether-based monomer favorably usable in the present invention could be obtained by setting the predetermined production conditions for such that the amount of the above impurity may not be larger than a definite amount, namely, by adopting a glycidyl compound in which the content of the above impurity is low as the glycidyl compound that is a raw material used for producing the allyl ether-based monomer and, also as to production conditions, adopting those which reduce the formation of this impurity.

Then, the present inventors have found out that the allyl ether-based monomer is the optimum raw material for such as water-soluble polymers. Specifically, the inventors have found that when the water-soluble polymers are used for scale inhibitors, the content of the compound of the above general formula (2) particularly has an influence on the important property, which is called gelation resistance, of those polymers, and thus the inventors have defined the favorable range of the above content in the polymer.

In the case where the content of the compound of the above general formula (2), among impurities in raw materials for producing the above allyl ether-based monomer (I), is more than 500 ppm, it follows that this impurity exists in a large amount in the allyl ether-based monomer or its composition as obtained by the production process, and further that the compound of the above general formula (2) is contained in the polymer as obtained by a process including the step of polymerizing at least one monomer component including the allyl ether-based monomer or its composition. In addition, in the case where the content of the above compound in the polymer is more than the specific amount, the gelation resistance which is a property of the polymer is so low that the polymer easily insolubilizes in boiler water systems or cooling water systems.

In addition, in the case where the content of the compound of the above general formula (2), among impurities in raw materials for the allyl ether-based monomer (I), is less than 0.1 ppm, this content is under the measurement limit in analysis. Therefore, the content of the compound of the above general formula (2) which mingles into or forms in raw materials for the above allyl ether-based monomer (I) is in the range of 0.1 to 500 ppm favorably for obtaining excellent performance as a scale inhibitor, and is in the range of 0.1 to 300 ppm desirably in order for the raw materials to be suitable for raw materials for a scale inhibitor having still higher performance. This content is more favorably in the range of 1 to 200 ppm.

When the above allyl ether-based monomer (I) is, for example, 3-allyloxpropane-1,2-diol (3-allyloxy-1,2-dihydroxypropane), such an allyl ether-based monomer (I) is, for example, obtainable by a reaction of allyl glycidyl ether with water. In this case, r=0, Z=OH, q=0, and Y=OH in the above general formula (1).

When the above allyl ether-based monomer is 3-allyloxy-2-hydroxypropanesulfonic acid, such an allyl ether-based monomer is, for example, obtainable by a reaction of allyl glycidyl ether with sodium hydrogensulfite. In this case, r=0, Z=SO$_3$Na(H), q=0, and Y=OH in the above general formula (1).

More favorably in a mode for carrying out the present invention, it is necessary to use raw allyl glycidyl ether in which the content of the compound of the above general formula (2) is not more than 500 ppm of the raw allyl glycidyl ether, specifically, is in the range of 0.1 to 500 ppm of the raw allyl glycidyl ether.

In other words, when the allyl ether-based monomer of the above general formula (1) is produced, it is favorable that an epoxy compound in which the content of the compound of the above general formula (2) as an impurity is in the range of 0.1 to 500 ppm of the epoxy compound is selected from among epoxy compounds used as raw materials. Such a method for evaluation and selection of raw materials is one of preferred embodiments of modes for producing the ally ether-based monomer used in the present invention. Namely, very effective as a method for selection of raw materials is a method which involves directing the attention to raw materials in which the content of the specific compound is low, and selecting such raw materials, and then producing therefrom, for example, a water-soluble polymer having properties such as excellent gelation resistance. This selection method is very effective as one of indices of methods for selection of raw materials for production of the polymer suitable for various uses or methods for evaluation of favorable ones of such raw materials.

One of specific examples of the allyl ether-based monomer used in the present invention is the following allyl ether-based monomer of p=1 in the above general formula (1). This structure is represented by the following general formula (5):

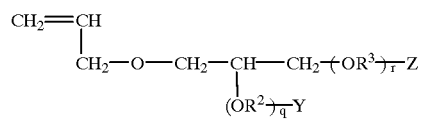

In addition, the polymer according to the present invention is more specifically a polymer obtained by a process including the step of polymerizing at least one monomer component that includes the monomer component of the above general formula (5), and this polymer at least has a structural unit of the below-mentioned general formula (6).

More specifically, the structure of this general formula (6) is a structure derived from the monomer component of the above general formula (5).

Herein the general formula (6) is:

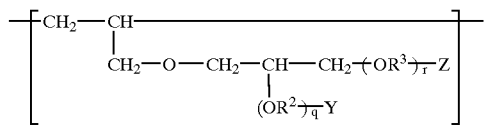

wherein:
q and r independently of each other denote 0 or an integer of 1 to 100;
R$^2$ and R$^3$ independently of each other denote an alkylene group with 2 to 4 carbon atoms; and
Y and Z independently of each other denote a hydroxyl group, an alkoxyl group with 1 to 4 carbon atoms, a monovalent phosphoric acid group (which may be in the form of a monovalent or divalent metal salt, an ammonium or organic amine salt, or a monoester or diester of an alkyl group with 1 to 4 carbon atoms), or a monovalent sulfonic acid group (which may be in the form of a monovalent or divalent metal salt, an ammonium or organic amine salt, or an ester of an alkyl group with 1 to 4 carbon atoms), or Y and Z are linked together and denote a divalent phosphoric or sulfonic acid group as a whole.

In modes for carrying out the present invention, the content of the specific compound of the above general formula (2) in the above-explained specific polymer is also similarly favorably in the range of 0.1 to 500 ppm of the polymer. In this range, the polymer displays good properties such as gelation resistance.

In the present invention, specifically, a favorable mode is an allyl ether-based monomer which is synthesized by a reaction of a glycidyl compound with water wherein the content of the compound of the general formula (2) in the glycidyl compound is in the range of 0.1 to 500 ppm of the glycidyl compound and, more specifically in this favorable mode, the glycidyl compound is allyl glycidyl ether, and a compound formed by a reaction of this allyl glycidyl ether with water is 3-allyloxypropane-1,2-diol (3-allyloxy-1,2-dihydroxypropane).

Similarly, another favorable mode in the present invention is an allyl ether-based monomer which is synthesized by a reaction of a glycidyl compound with sodium hydrogensulfite wherein the content of the compound of the general formula (2) in the glycidyl compound is in the range of 0.1 to 500 ppm of the glycidyl compound and, more specifically in this favorable mode, the glycidyl compound is allyl glycidyl ether, and a compound formed by a reaction of this allyl glycidyl ether with sodium hydrogensulfite is 3-allyloxy-2-hydroxypropanesulfonic acid.

The above gelation resistance is a numerical value to evaluate easiness of precipitation of a polymer in the presence of calcium ion, and is used as an index to indicate the performance of the scale inhibitor according to the present invention. The above gelation resistance can be determined by the below-mentioned gelation resistance test. The smaller this gelation resistance value is, the more excellent the gelation resistance of the polymer is and the higher performance this polymer displays when being used as a scale inhibitor.

The (meth)acrylic acid-based monomer (II) usable as a monomer component in the present invention is at least one compound selected from the group consisting of compounds having structures of the following general formula (7):

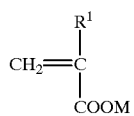

wherein:
$R^1$ denotes hydrogen or a methyl group;
and M denotes hydrogen, a monovalent metal, a divalent metal, an ammonium group, or an organic amine group.

Examples of the above (meth)acrylic acid-based monomer (II) include acrylic acid, sodium acrylate, potassium acrylate, lithium acrylate, ammonium acrylate, methacrylic acid, sodium methacrylate, potassium methacrylate, lithium methacrylate, and ammonium methacrylate. In addition, these may have structures of various metal salts such as sodium salts.

In addition, the amount of another monomer which is used in the present invention if necessary, namely, the other monomer (III) copolymerizable with the above allyl ether-based monomer (I) and the above (meth)acrylic acid-based monomer (II), is not especially limited. For example, when the water-soluble polymer is desired to have good water solubility and good gelation resistance, the amount of the other copolymerizable monomer (III) as used is not larger than 70 weight %, namely, is in the range of 0 to 70 weight %, more favorably 0 to 50 weight %, still more favorably 0 to 25 weight %, wherein the total of the allyl ether-based monomer (I), the (meth)acrylic acid-based monomer (II), and the other copolymerizable monomer (III) is 100 weight %.

Examples of the above other copolymerizable monomer (III) include: styrene, p-methylstyrene, α-methylstyrene, vinyl acetate, vinylpyrrolidone, methyl vinyl ether, ethyl vinyl ether, (meth)allyl alcohol, isoprenol, isoprene, butadiene, (meth)acrylonitrile, (meth)acrylamide, N,N-dimethyl(meth)acrylamide, methyl (meth)acrylate, ethyl (meth)acrylate, butyl (meth)acrylate, 2-ethylhexyl (meth)acrylate, hydroxyethyl (meth)acrylate, dimethylaminoethyl (meth)acrylate, diethylaminoethyl (meth)acrylate, polyethylene glycol mono(meth)acrylate, methoxypolyethylene glycol (meth)acrylate, ethoxypolyethylene glycol (meth)acrylate, polypropylene glycol mono(meth)acrylate, methoxypolypropylene glycol (meth)acrylate, phenoxypolyethylene glycol (meth)acrylate, and naphthoxypolyethylene glycol (meth)acrylate; maleic acid, fumaric acid, itaconic acid, and monovalent metal salts, divalent metal salts, ammonium salts, or organic amine salts of these acids; and vinylsulfonic acid, (meth)allylsulfonic acid, styrenesulfonic acid, isoprenesulfonic acid, (meth)allylbenzenesulfonic acid, 2-(meth)acrylamido-2-methylpropanesulfonic acid, sulfoethyl (meth)acrylate, 2-methyl-1,3-betadiene-1-sulfonic acid, 2-hydroxy-3-(meth)acrylamidopropanesulfonic acid, isoamylsulfonic acid, and monovalent metal salts, divalent metal salts, ammonium salts, or organic amine salts of these acids. These other monomers (III) may be used either alone respectively or in combinations with each other. A way to make the present invention polymer more favorable as a water-soluble polymer is to select water-soluble monomer from among the above-enumerated monomers. In addition, when such as ability to chelate metals, detergency and dispersibility are improved, it might be favorable to use unsaturated dibasic acids, such as maleic acid and fumaric acid, in combinations with each other.

As to the amount of each of the above allyl ether-based monomer (I), the above (meth)acrylic acid-based monomer (II), and the above other copolymerizable monomer (III) as used, the allyl ether-based monomer (I) is in the range of 1.0 to 95.0 weight %, the (meth)acrylic acid-based monomer (II) is in the range of 5 to 99.0 weight %, and the copolymerizable monomer (III) is in the range of 0 to 70 weight %, wherein the total of these monomers is 100 weight %. Favorably for the polymer obtained in the present invention to have good properties as a scale inhibitor, the amounts of the allyl ether-based monomer (I), the (meth)acrylic acid-based monomer (II), and the monomer (III) as used are in their respective ranges as mentioned above.

The process for obtaining a copolymer from the monomer components including the allyl ether-based monomer (I), the (meth)acrylic acid-based monomer (II), and the monomer (III) can be carried out by conventional polymerization methods, of which the examples include polymerization in solvents such as water, organic solvents, and solvent mixtures of water-soluble organic solvents with water. In the case of the polymerization in the water solvent in this process, polymerization initiators such as persulfate salts and hydrogen peroxide are used and, jointly therewith, promoters such as sodium hydrogensulfite and ascorbic acid can be used. The polymerization in the solvent mixtures of water-soluble organic solvents with water can involve the use of materials selected fitly from among the above various polymerization initiators or combinations thereof with the promotors.

The copolymer as obtained in the above way can be used as a scale inhibitor even as it is, but also can be used after being further neutralized with alkaline substances if necessary. Examples of such alkaline substances include: hydroxides, chlorides, and carbonates of monovalent and divalent metals; ammonia; and organic amines.

The scale inhibitor comprising the polymer obtained by the process according to the present invention has sufficient effects even if the polymer is used alone as the scale inhibitor, but also the polymer can be used together with other additives which are used in technical fields to which the present invention pertains. For example, this scale inhibitor can be used as a phosphorus-free water-treating composition by combining the scale inhibitor with phosphorus-free anticorrosives such as molybdenum-based ones. In addition, it is also possible to use the scale inhibitor together with slime inhibitors or chelating agents if necessary.

The scale inhibitor comprising the polymer obtained by the process according to the present invention can be used in the same way as of conventional scale inhibitors in which, for example, the scale inhibitor is injected at a constant rate or intermittently so that the concentration thereof may be constant in water being circulated. Sufficient effects are displayed generally when the amount of the scale inhibitor as added is in the range of 1 to 50 ppm.

The case of the scale inhibitor is mentioned above as one example of additives to water systems. However, the content of the specific impurity in the allyl ether-based monomer or its composition according to the present invention is so low that this monomer or its composition is useful also as the monomer component for polymerization to give water-soluble polymers which are desired to have the same properties as those of the scale inhibitor, and the same effects on improvement of properties as those of the scale inhibitor can be expected also from these polymers for various uses, namely, water-soluble polymers. In addition, the above water-soluble polymer can be expected to have properties good in such as: gelation resistance and calcium ion dispersibility in use for detergent builders; detergency and bleachability in use for fiber-treating agents; and dispersibility in use for other various dispersants (for example, pigment dispersants).

(Effects and Advantages of the Invention):

The polymer as obtained by the process according to the present invention has so excellent gelation resistance as to have the advantage of never insolubilizing in various water systems such as boiler water systems and cooling water systems. In addition, the above polymer is enabled to be a polymer useful for scale inhibition, which polymer can inhibit the deposition of the zinc ion or phosphate ion and thereby control the formation of scale even in joint use with anticorrosives such as zinc-based or condensed phosphoric acid-based ones, and contains no or little phosphorus because of containing no phosphorus compound and is therefore excellent in property of low environmental pollution.

The polymer as obtained by the process according to the present invention is a polymer useful also for usage as the same additives to water systems as the above, such as treating agents for water systems, detergents, water-treating agents, fiber-treating agents, detergent builders, and various dispersants.

Therefore, the above polymer is enabled to be a polymer useful for scale inhibition, which polymer can inhibit the deposition of the zinc ion or phosphate ion and thereby control the formation of scale even in joint use with anticorrosives such as zinc-based or condensed phosphoric acid-based ones, and contains no or little phosphorus because of containing no phosphorus compound and is therefore excellent in property of low environmental pollution. Furthermore, this polymer is enabled to be a polymer which has so excellent gelation resistance as never to insolubilize in boiler water systems or cooling water systems.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to them. In addition, the unit "%" in the examples and the comparative examples is by weight. The gelation resistance of each polymer (hereinafter referred to as "water-soluble copolymer"), as obtained in the below-mentioned examples and comparative examples, and the scale inhibition rate of a scale inhibitor comprising the water-soluble copolymer as a main component were evaluated by the following methods:

(1) Gelation resistance test:

Desalted water, boric acid-sodium borate, and an aqueous calcium chloride solution were added in sequence into a tall beaker of 500 ml to prepare a test liquid having a weight of 500 g, pH=8.5, a polymer concentration of 100 ppm in terms of solid content, and a calcium concentration of 900 ppm in terms of calcium carbonate. This test liquid was left still in a thermostat of 90° C. for 1 hour, and then stirred, and then placed into a quartz cell of 5 cm to measure an absorbance (a) of the test liquid at a UV wavelength of 380 nm. The same test liquid as the above except to contain no calcium chloride was prepared as a blank, and its absorbance (b) was measured in the same way as the above. Then, the gelation degree was determined from the below-mentioned equation. The larger this gelation degree is, the more easily the gelation is caused by bonding of the copolymer to the calcium ion to provide inferior results with regard to the performance in use of the copolymer as a scale inhibitor.

Gelation degree=$(a)-(b)$ (2) Calcium carbonate scale inhibition test:

First, 70 g of desalted water was charged into a hermetically sealable glass bottle having a capacity of 225 ml, and then mixed with 10 g of a 0.735% aqueous calcium chloride dihydrate solution and 10 g each of 0.001%, 0.005%, and 0.01% (corresponding to 1 ppm, 5 ppm, and 10 ppm respectively based on the supersaturated aqueous solution as obtained below) aqueous solutions of water-soluble copolymers (1), (2), (3), (4), and (5) as obtained in Examples 1 to 5. Then, 10 g of a 0.42% aqueous sodium hydrogencarbonate solution was further added and mixed into them, and then the resultant solution was adjusted to pH=8.5 with an aqueous sodium hydroxide solution. The glass bottle containing the resultant supersaturated aqueous solution of calcium carbonate 500 ppm was hermetically sealed and then left still while being heated at 60° C. for 18 hours. Thereafter, the glass bottle was cooled, and then the resultant precipitate was filtered off with a membrane filter of 0.1 μm, and then the resultant filtrate was analyzed according to JIS K0101 to determine the scale inhibition rate from the below-mentioned equation.

Tests were carried out in the same way as the above except that the water-soluble copolymers (6) and (7) as obtained in Comparative Examples 1 and 2 were substituted for the water-soluble copolymers (1) to (5) as obtained in Examples 1 to 5.

In addition, a test was carried out in the same way as the above except to add no water-soluble copolymer.

The scale inhibition rate can be calculated from the following equation:

$$\text{Scale inhibition rate } (\%) = 100 \times (C-B)/(A-B)$$

wherein:
- A: Ca concentration (=500 ppm: in terms of calcium carbonate) before heat treatment;
- B: Ca concentration (=190 ppm: in terms of calcium carbonate) in filtrate after test of no addition of scale inhibitor;
- C: Ca concentration in filtrate after test of addition of scale inhibitor.

(3) Measurement method for molecular weight of polymer:

The weight-average molecular weight was measured by the following method, that is, GPC (gel permeation chromatography):
Column: GF-7MHQ (made by Showa Denko Co.)
Moving phase: aqueous solution as prepared by adding pure water to 34.5 g of disodium hydrogenphosphate dodecahydrate and 46.2 g of sodium dihydrogenphosphate dihydrate (both of which were special grade reagents) to adjust the entirety to 5,000 g
Detector: UV 214 nm (Model 481 made by Nippon Waters Co., Ltd.)
Flow rate: 0.5 ml/min
Temperature: 35° C.
Calibration curve: poly(sodium acrylate) standard samples (made by Sowa Kagaku Co.)

EXAMPLE 1

First, 235 g of desalted water was charged into a four-necked flask of 2 liters in capacity as fitted with a reflux condenser and a dropping apparatus. Thereafter, while the desalted water was stirred at a boiling point, the following materials were dropwise added thereto over a period of 2 hours each: 530 g of a 35% aqueous solution of sodium acrylate as a (meth)acrylic acid-based monomer (II), 163.0 g of a 40% aqueous solution of 3-allyloxy-1,2-dihydroxypropane as an allyl ether-based monomer (I), and 74.5 g of a 15% aqueous solution of sodium persulfate as a polymerization initiator. The temperature of the resultant reaction mixture was maintained at a boiling point over a period of 30 minutes since the end of the dropwise addition, thus completing the polymerization to obtain a yellowish transparent water-soluble copolymer (1).

The 40% aqueous solution of 3-allyloxy-1,2-dihydroxypropane had been synthesized by a reaction of ally glycidyl ether with pure water. The content of 2-ethyl-4-chloromethyldioxolane as an impurity in the allyl glycidyl ether, among the raw materials as used for the synthesis of the aqueous solution of 3-allyloxy-1,2-dihydroxypropane, was 80 ppm of the allyl glycidyl ether.

The weight-average molecular weight of the above water-soluble copolymer (1), as measured by the gel permeation chromatography, was 4,600. In addition, the gelation resistance of the above water-soluble copolymer (1) was evaluated by the above gelation resistance test.

EXAMPLE 2

First, 211.0 g of desalted water was charged into the same four-necked flask as that used in Example 1. Thereafter, while the desalted water was stirred at a boiling point, the following materials were dropwise added thereto over a period of 2 hours each: 239.8 g of a 30% aqueous solution of sodium 3-allyloxy-2-hydroxypropanesulfonate as an allyl ether-based monomer (I), 472.7 g of a 35% aqueous solution of sodium acrylate as a (meth)acrylic acid-based monomer (II), and 72 g of a 15% aqueous solution of sodium persulfate as a polymerization initiator. The temperature of the resultant reaction mixture was maintained at a boiling point over a period of 30 minutes since the end of the dropwise addition, thus completing the polymerization to obtain a yellowish transparent water-soluble copolymer (2).

The 30% aqueous solution of sodium 3-allyloxy-2-hydroxypropanesulfonate had been obtained by adding an aqueous sodium hydrogensulfite solution to ally glycidyl ether to make them react with each other.

The content of 2-ethyl-4-chloromethyldioxolane as an impurity in the allyl glycidyl ether, among the raw materials as used for the synthesis of the sodium 3-allyloxy-2-hydroxypropanesulfonate, was 20 ppm of the allyl glycidyl ether. The weight-average molecular weight of the above water-soluble copolymer (2), as measured by the gel permeation chromatography, was 4,900. The gelation resistance test for the water-soluble copolymer (2) as obtained above was carried out in the same way as of Example 1.

EXAMPLE 3

A water-soluble copolymer (3) was obtained in the very same way as of Example 2 except that the content of 2-ethyl-4-chloromethyldioxolane in the allyl glycidyl ether, among raw materials as used for the synthesis of the sodium 3-allyloxy-2-hydroxypropanesulfonate, was 80 ppm of the allyl glycidyl ether.

The weight-average molecular weight of the above water-soluble polymer (3), as measured by the gel permeation chromatography, was 5,000. The gelation resistance test for the water-soluble copolymer (3) as obtained above was carried out in the same way as of Example 1.

EXAMPLE 4

A water-soluble copolymer (4) was obtained in the very same way as of Example 2 except that the content of 2-ethyl-4-chloromethyldioxolane in the allyl glycidyl ether, among raw materials as used for the synthesis of the sodium 3-allyloxy-2-hydroxypropanesulfonate, was 160 ppm of the allyl glycidyl ether.

The weight-average molecular weight of the above water-soluble polymer (4), as measured by the gel permeation chromatography, was 5,000. The gelation resistance test for the water-soluble copolymer (4) as obtained above was carried out in the same way as of Example 1.

EXAMPLE 5

A water-soluble copolymer (5) was obtained in the very same way as of Example 2 except that the content of 2-ethyl-4-chloromethyldioxolane in the allyl glycidyl ether, among raw materials as used for the synthesis of the sodium 3-allyloxy-2-hydroxypropanesulfonate, was 400 ppm of the allyl glycidyl ether. The weight-average molecular weight of the above water-soluble polymer (5), as measured by the gel permeation chromatography, was 5,300.

The gelation resistance test for the water-soluble copolymer (5) as obtained above was carried out in the same way as of Example 1.

COMPARATIVE EXAMPLE 1

A water-soluble copolymer (6) was obtained in the same way as of Example 1 except that the raw materials as used for the synthesis of the 40% aqueous solution of 3-allyloxy-1,2-dihydroxypropane were such that the content of 2-ethyl-4-chloromethyldioxolane as an impurity in the allyl glycidyl ether was 800 ppm of the allyl glycidyl ether. The weight-average molecular weight of the above water-soluble polymer (6) was 4,600.

COMPARATIVE EXAMPLE 2

A water-soluble copolymer (7) was obtained in the same way as of Example 2 except that the raw materials as used for the synthesis of the 30% aqueous solution of sodium 3-allyloxy-2-hydroxypropanesulfonate were such that the content of 2-ethyl-4-chloromethyldioxolane as an impurity in the allyl glycidyl ether was 800 ppm of the allyl glycidyl ether. The weight average molecular weight of the above water-soluble polymer (7) was 4,800.

The gelation resistance tests for the above water-soluble copolymer (6) as obtained in Comparative Example 1 and for the above water-soluble copolymer (7) as obtained in Comparative Example 2 were carried out in the same way as of Example 1.

The results of the above are shown in Table 1. Incidentally, the <gelation degree> in this table as an item of the gelation resistance.

TABLE 1

|  | Scale inhibitor | 2-Ethyl-4-chloromethyl-1,3-dioxolane content (ppm) | Gelation degree | Amount of addition (ppm) | $CaCO_3$ in filtrate (ppm) | Scale inhibition rate (%) |
|---|---|---|---|---|---|---|
| Example 1 | Copolymer (1) | 80 | 0.030 | 1 | 400 | 67.7 |
|  |  |  |  | 5 | 465 | 88.7 |
|  |  |  |  | 10 | 500 | 100.0 |
| Example 2 | Copolymer (2) | 20 | 0.015 | 1 | 390 | 64.5 |
|  |  |  |  | 5 | 470 | 90.3 |
|  |  |  |  | 10 | 500 | 100.0 |
| Example 3 | Copolymer (3) | 80 | 0.013 | 1 | 405 | 69.4 |
|  |  |  |  | 5 | 468 | 89.7 |
|  |  |  |  | 10 | 498 | 99.4 |
| Example 4 | Copolymer (4) | 160 | 0.018 | 1 | 410 | 71.0 |
|  |  |  |  | 5 | 468 | 89.7 |
|  |  |  |  | 10 | 499 | 99.7 |
| Example 5 | Copolymer (5) | 400 | 0.018 | 1 | 407 | 70.0 |
|  |  |  |  | 5 | 472 | 91.0 |
|  |  |  |  | 10 | 498 | 99.4 |
| Comparative Example 1 | Copolymer (6) | 800 | 0.150 | 1 | 375 | 59.7 |
|  |  |  |  | 5 | 440 | 80.6 |
|  |  |  |  | 10 | 494 | 98.1 |
| Comparative Example 2 | Copolymer (7) | 800 | 0.095 | 1 | 367 | 57.1 |
|  |  |  |  | 5 | 452 | 84.5 |
|  |  |  |  | 10 | 491 | 97.1 |
|  | No addition | — | — | 0 | 190 | 0 |

As is evident from Table 1, it would be understood that polymers having so high gelation degree as to be inferior in respect to gelation resistance were obtained in the cases of Comparative Examples 1 and 2 where the allyl glycidyl ether in which the content of 2-ethyl-4-chloromethyldioxolane having been mingled as an impurity into the allyl glycidyl ether was 800 ppm of the allyl glycidyl ether was used as a raw material for the allyl ether-based monomer (I). On the other hand, it would be understood that the water-soluble copolymers (1) to (5) as obtained in the Examples according to the present invention were more excellent in gelation resistance than the water-soluble copolymers (6) and (7) as obtained in the Comparative Examples.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A production process for an allyl ether-based polymer, which comprises the step of polymerizing at least one monomer component that includes an allyl ether-based monomer as an essential component, wherein: the allyl ether-based monomer is an allyl ether-based monomer of the below-mentioned general formula (1); and the content of a compound of the below-mentioned general formula (2) in the monomer component is not more than 500 ppm of the monomer component;

wherein the general formula (1) is:

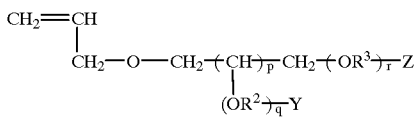

wherein:
- p denotes an integer of 1 to 4;
- q and r independently of each other denote 0 or an integer of 1 to 100;
- $R^2$ and $R^3$ independently of each other denote an alkylene group with 2 to 4 carbon atoms; and
- Y and Z independently of each other denote a hydroxyl group, an alkoxyl group with 1 to 4 carbon atoms, a monovalent phosphoric acid group (which may be in the form of a monovalent or divalent metal salt, an ammonium or organic amine salt, or a monoester or diester of an alkyl group with 1 to 4 carbon atoms), or a monovalent sulfonic acid group (which may be in the form of a monovalent or divalent metal salt, an ammonium or organic amine salt, or an ester of an alkyl group with 1 to 4 carbon atoms), or Y and Z are linked together and denote a divalent phosphoric or sulfonic acid group as a whole;

and wherein the general formula (2) is:

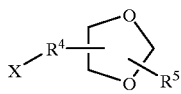

wherein:
- $R^4$ denotes an alkylene group with 2 to 4 carbon atoms;
- $R^5$ denotes an alkyl group with 1 to 5 carbon atoms; and
- X denotes a halogen.

2. A production process according to claim 1, wherein the compound of the general formula (2) is such as was contained in a raw material for producing the allyl ether-based monomer.

3. A production process according to claim 1, wherein the monomer components include the allyl ether-based monomer in a ratio of 1.0–95.0 weight % to the monomer components.

4. A production process according to claim 2, wherein the monomer components include the allyl ether-based monomer in a ratio of 1.0–95.0 weight % to the monomer components.

5. A production process according to claim 3, wherein the monomer components include the allyl ether-based monomer (I) in a ratio of 1.0–95.0 weight %, a (meth)acrylic acid-based monomer (II) in a ratio of 99.0–5.0 weight %, and another copolymerizable monomer (III) in a ratio of 0–70 weight %, to the monomer components.

6. A production process according to claim 4, wherein the monomer components include the allyl ether-based monomer (I) in a ratio of 1.0–95.0 weight %, a (meth)acrylic acid-based monomer (II) in a ratio of 99.0–5.0 weight %, and another copolymerizable monomer (III) in a ratio of 0–70 weight %, to the monomer components.

7. A production process according to claim 1, wherein the resultant allyl ether-based polymer has an allyl ether-based monomer-derived structural unit of the below-mentioned general formula (3) in a ratio of 0.5–80 mol % to the polymer and a (meth)acrylic acid-based monomer-derived structural unit of the below-mentioned general formula (4) in a ratio of 20–99.5 mol % to the polymer, wherein the general formula (3) is:

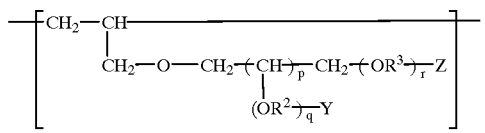

wherein:
- p denotes an integer of 1 to 4;
- q and r independently of each other denote 0 or an integer of 1 to 100;
- $R^2$ and $R^3$ independently of each other denote an alkylene group with 2 to 4 carbon atoms; and
- Y and Z independently of each other denote a hydroxyl group, an alkoxyl group with 1 to 4 carbon atoms, a monovalent phosphoric acid group (which may be in the form of a monovalent or divalent metal salt, an ammonium or organic amine salt, or a monoester or diester of an alkyl group with 1 to 4 carbon atoms), or a monovalent sulfonic acid group (which may be in the form of a monovalent or divalent metal salt, an ammonium or organic amine salt, or an ester of an alkyl group with 1 to 4 carbon atoms), or Y and Z are linked together and denote a divalent phosphoric or sulfonic acid group as a whole;

and wherein the general formula (4) is:

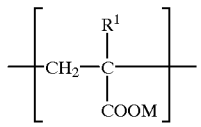

wherein:
- $R^1$ denotes an alkyl group with 1 to 12 carbon atoms or an alicyclic alkyl group; and
- M denotes a metal salt;

and wherein the content of a compound of the below-mentioned general formula (2) in the polymer is not more than 500 ppm of the polymer, wherein the general formula (2) is:

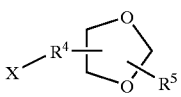

wherein:
- $R^4$ denotes an alkylene group with 2 to 4 carbon atoms;
- $R^5$ denotes an alkyl group with 1 to 5 carbon atoms; and
- X denotes a halogen.

8. A production process according to claim 1, wherein the resultant allyl ether-based polymer is used as a component of an additive to water systems.

9. A production process according to claim 8, wherein the additive to water systems is a scale inhibitor.

* * * * *